US010939187B1

(12) United States Patent
Goyal et al.

(10) Patent No.: US 10,939,187 B1
(45) Date of Patent: Mar. 2, 2021

(54) TRAVERSING A SEMANTIC GRAPH TO PROCESS REQUESTS FOR VIDEO

(71) Applicant: Amazon Technologies, Inc., Seattle, WA (US)

(72) Inventors: Dushyant Goyal, Redmond, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 612 days.

(21) Appl. No.: 15/234,719

(22) Filed: Aug. 11, 2016

(51) Int. Cl.
*H04N 21/8541* (2011.01)
*H04N 21/472* (2011.01)
*H04N 21/81* (2011.01)
*H04N 21/435* (2011.01)
*H04N 21/845* (2011.01)
*H04N 21/235* (2011.01)
*H04N 21/25* (2011.01)
*H04N 21/84* (2011.01)

(52) U.S. Cl.
CPC ..... *H04N 21/8541* (2013.01); *H04N 21/2353* (2013.01); *H04N 21/252* (2013.01); *H04N 21/435* (2013.01); *H04N 21/47202* (2013.01); *H04N 21/47205* (2013.01); *H04N 21/816* (2013.01); *H04N 21/84* (2013.01); *H04N 21/8456* (2013.01)

(58) Field of Classification Search
CPC ........... H04N 21/8541; H04N 21/2353; H04N 21/252; H04N 21/435; H04N 21/47202; H04N 21/47205; H04N 21/816; H04N 21/84; H04N 21/8456

USPC .......................................................... 725/61
See application file for complete search history.

(56) References Cited

U.S. PATENT DOCUMENTS

| | | | | |
|---|---|---|---|---|
| 9,430,115 | B1* | 8/2016 | Yun ................... | G06F 17/30843 |
| 2005/0021653 | A1* | 1/2005 | Song ................. | G06F 17/30828 |
| | | | | 709/207 |
| 2008/0095512 | A1* | 4/2008 | Murabayashi ....... | G11B 27/034 |
| | | | | 386/248 |
| 2008/0292279 | A1* | 11/2008 | Kamada ............ | G06F 17/30793 |
| | | | | 386/244 |
| 2008/0313570 | A1* | 12/2008 | Shamma ........... | G06F 17/30525 |
| | | | | 715/846 |
| 2009/0041356 | A1* | 2/2009 | Barbieri ................ | G06F 16/739 |
| | | | | 382/190 |
| 2009/0248637 | A1* | 10/2009 | Yamasaki .............. | H04N 5/147 |
| 2010/0195975 | A1* | 8/2010 | Issa ........................ | H04N 5/783 |
| | | | | 386/343 |
| 2010/0199295 | A1* | 8/2010 | Katpelly ............... | H04L 67/306 |
| | | | | 725/14 |
| 2011/0179084 | A1* | 7/2011 | Waddington ........... | G06Q 30/02 |
| | | | | 707/794 |
| 2011/0305436 | A1* | 12/2011 | Haberman ........... | G06Q 10/107 |
| | | | | 386/278 |

(Continued)

*Primary Examiner* — Joshua D Taylor
*Assistant Examiner* — Jaycee Imperial
(74) *Attorney, Agent, or Firm* — Thomas | Horstemeyer LLP

(57) ABSTRACT

Disclosed are various examples that relate to providing an alternative viewing experience for video content. A semantic graph corresponding to the content is generated. The semantic graph is traversed and the video content segments corresponding to a selected attribute within the semantic graph are played back in an ordering that can vary from a linear representation of the content.

20 Claims, 8 Drawing Sheets

(56) References Cited

U.S. PATENT DOCUMENTS

| | | | | |
|---|---|---|---|---|
| 2014/0136186 A1* | 5/2014 | Adami | ............... | H04N 21/8541 704/9 |
| 2014/0219630 A1* | 8/2014 | Minder | ................ | G11B 27/005 386/241 |
| 2014/0306987 A1* | 10/2014 | Snibbe | ................... | G06Q 50/01 345/619 |
| 2015/0169542 A1* | 6/2015 | Lin | .................... | H04N 5/44543 725/53 |
| 2017/0212949 A1* | 7/2017 | Bajaj | ................ | G06F 17/30598 |

* cited by examiner

TRAVERSING A SEMANTIC GRAPH TO PROCESS REQUESTS FOR VIDEO

BACKGROUND

People generally consume content such as movies or episodes of a series through a linear representation of the content. In other words, the scenes of a movie or series are arranged in a particular order by the publisher and provided on a physical medium or transmitted to a user's device over a network connection. The ability to view the scenes of a movie or video in an order other than the order in which the content was published is typically limited.

BRIEF DESCRIPTION OF THE DRAWINGS

Many aspects of the present disclosure can be better understood with reference the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
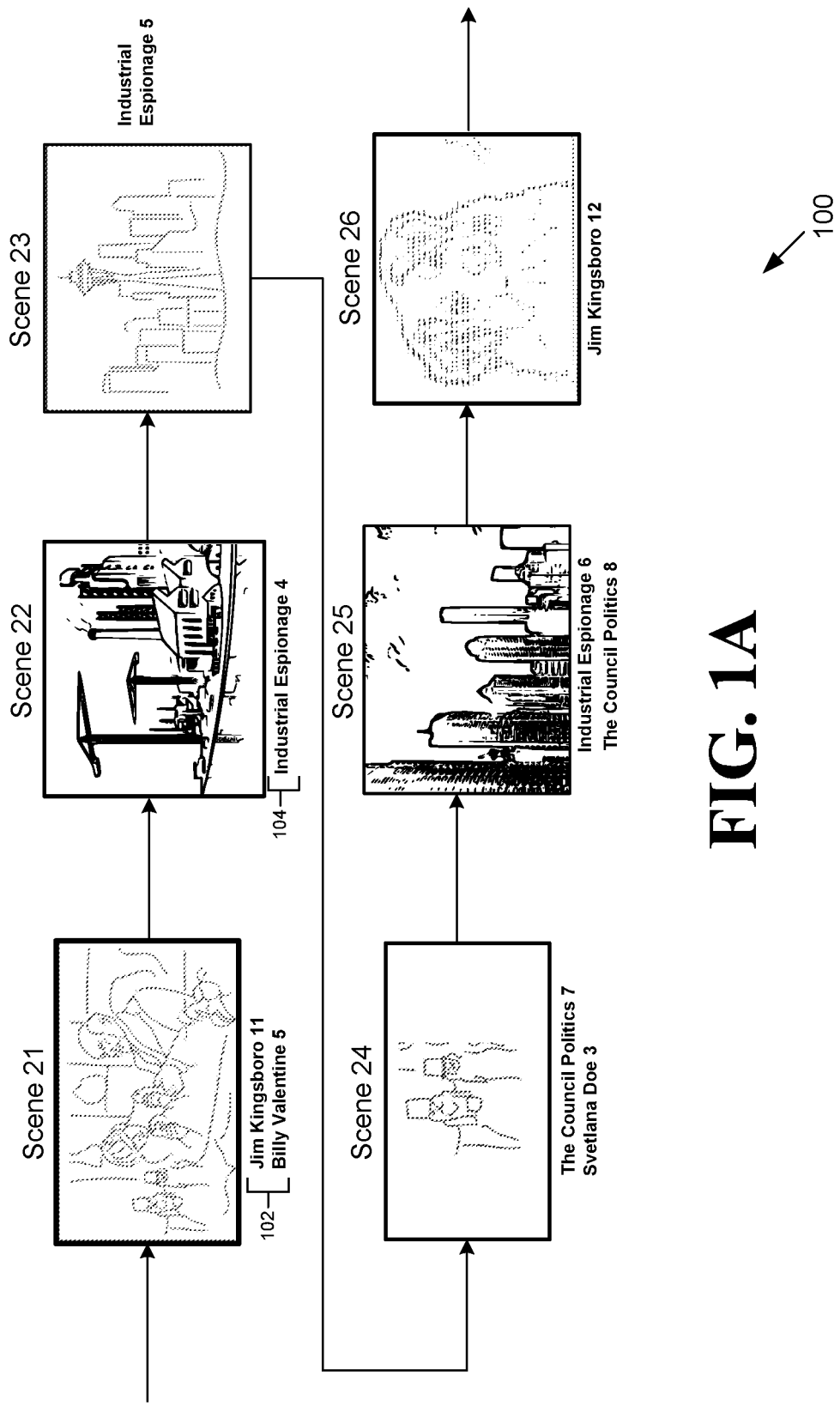
FIG. 1A is a drawing of a portion of a linear representation of a video content object.

The present disclosure relates to interpreting a semantic graph associated with a video content object and providing a user-directed viewing experience. The user-directed viewing experience can allow a user to select one or more semantic attributes. Upon selection of a semantic attribute, a video application can generate a viewing experience in which video content segments are played according to an ordering that is determined from a semantic graph. This ordering can vary from an ordering of the video content segments as originally arranged by a content creator. For example, a user might wish to view portions of a television series that are related to a particular character, actor, or plotline within the series. The user might also wish to avoid or skip scenes that are not related to a selected semantic attribute. This user-directed viewing experience can result in an ordering of scenes within a series and spanning episodes of the series that vary from the original ordering of scenes of the series as episodes of a series were originally presented by a content-creator.

A video content object, which can include a movie, an episode of a television series, a season of multiple episodes of the series, or all season of the series, is generally authored by a content creator with a specific ordering of the various scenes that comprise the video content object. In other words, an opening scene is followed by a second scene and so forth, and the scenes often tell a story or narrative in a particular order. In examples of this disclosure, a semantic graph can relate the various scenes of a video content object according to semantic attributes. The semantic graph can be represented within metadata provided by a content creator for a movie or television series or automatically generated by examples of this disclosure. The semantic graph can identify scenes or segments of a video content object as well as one or more semantic attributes that are linked with each of the scenes.

The semantic graph can be represented by various types of data structures. In one example, a graph data structure is used. The graph can identify scenes or segments of a video content object as nodes. Each of the nodes can be tagged with a particular semantic attribute and an ordering associated with the semantic attribute. For example, the node can comprise a scene within a television series. The node can be tagged with a semantic attribute. The node can also be tagged with an ordering associated with the semantic attribute. In one scenario, the node can identify a particular segment or clip of video content and specify that the clip is the third scene associated with a particular subplot within the television series. The node can also include linkages to neighboring scenes associated with the semantic attribute.

A video content object that includes various video content segments can also be associated with a linear representation. The linear representation is an ordering of the video content segments as specified by the content creator. For example, the linear representation starts with scene one of the first episode of a series or movie and proceeds to scene two, scene three, and so on. In one example, the linear representation can also be represented by a graph data structure that links video content segments corresponding to the video content object together.

To illustrate, reference is made to FIG. 1A, which shows a graphical depiction of a portion of a video content object 100 that is split into various video content segments. FIG. 1A also illustrates how video content segments can be tagged with semantic attributes. FIG. 1A does not necessarily graphically depict a semantic graph data structure, but instead it depicts a portion of a linear representation of a video content object 100 and the semantic attributes that are associated with some of the video content segments into which the video content object 100 is segmented.

As depicted, the linear representation of the video content object 100 proceeds sequentially in an ordered fashion from scene to scene, or video content segment to video content segment, as defined by a content creator. A video player or other application processing the video content object 100 can traverse the linear representation. For example, a video player can play Scene 21, and when Scene 21 is complete, it can then play Scene 22, and so on. Additionally, as noted in the drawing, the scenes, or video content segments, are associated with semantic attributes 102, 104, etc. Each video content segment can be associated with more than one semantic attribute. The video content segments can also be ordered according to the semantic attributes with which they are associated. In the depicted example, Scene 21 is the eleventh scene of the "Jim Kingsboro" semantic attribute, and Scene 26 is the twelfth scene of the same semantic attribute.

A user can initiate linear playback of the video content object, and a video player can play the video content segments in linear order as specified by the content creator. However, examples of the disclosure can provide an alternative playback experience based upon the semantic graph that identifies video content segments of the video content object 100 with semantic attributes, such as semantic attributes 102, 104, etc. Accordingly, reference is now made to FIG. 1B, which continues the example of FIG. 1A.

Figure 1B:
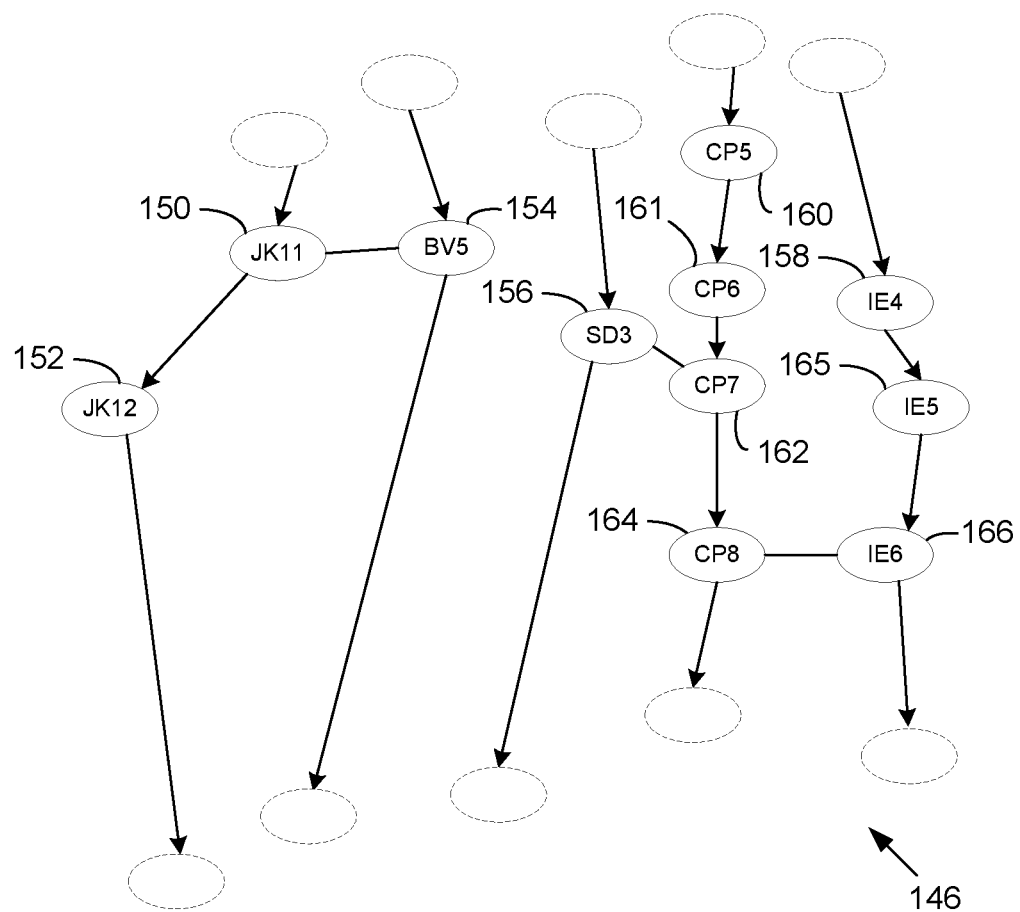
FIG. 1B is a drawing of a portion of a semantic graph corresponding to a video content object.

FIG. 1B depicts a portion semantic graph 146 corresponding to a portion of the video content object 100 of FIG. 1A. FIG. 1B illustrates how semantic attributes can be arranged in a graph data structure that can link scenes together by semantic attribute. In the depicted example, node 150 corresponds to the "Jim Kingsboro 11" semantic attribute from FIG. 1A. The node 150 identifies node 152 as its next node. Node 152 corresponds to the "Jim Kingsboro 12" semantic attribute from FIG. 1A. Each of the nodes in the semantic graph 146 can identify a particular video content segment from the video content object 100. In one example, the nodes can identify a beginning timecode and an ending timecode from the video content object 100. In another example, the nodes can identify a scene by an identifier. The video content segment identified by a node identifies the scene that should be played by a video player corresponding to the node in the semantic graph 146.

Returning to the example of FIG. 1B, node 150 also identifies node 154 as a dependent node or peer node. Node 154 corresponds to the "Billy Valentine 5" semantic attribute from FIG. 1A. If a video player traverses the semantic graph 146 in response to a user selection of the "Jim Kingsboro" semantic attribute, upon arriving at node 150, the video player can determine that "Billy Valentine 5," or node 154, is a dependent node of node 150. In this sense, the relationship between these two nodes signifies that in order to view the "Billy Valentine 5" scene or video content segment, the user should also view the "Jim Kingsboro" scenes in order to understand the contents of the scene.

Therefore, in response to identifying a dependent node, a video player traversing the semantic graph 146 can also determine whether the user, based upon the consumption or viewing history of the user, has consumed Billy Valentine nodes 1-4. In this way, the semantic graph 146 can allow a user to view a particular plotline within a video content object 100 but also maintain story line continuity because a video player traversing the semantic graph 146 can determine dependent nodes on the graph once a particular node has been reached.

Continuing the example of FIG. 1B, if a user selects the "Svetlana Doe" semantic attribute, a video player can traverse the semantic graph 146 to identify those video content segments that are associated with the selected attribute. The video player can also identify dependent nodes. For example, the "Council Politics 7" node 162, and node 156 are dependent upon one another. Therefore, if a video player reaches node 156 in traversing the Svetlana Doe semantic attribute, the video player can then play the video content segments associated with Council Politics semantic attribute, or the scenes associated with parent nodes of node 162 (i.e. node 160 and 161), if the user has not previously viewed these scenes.

Figure 1C:
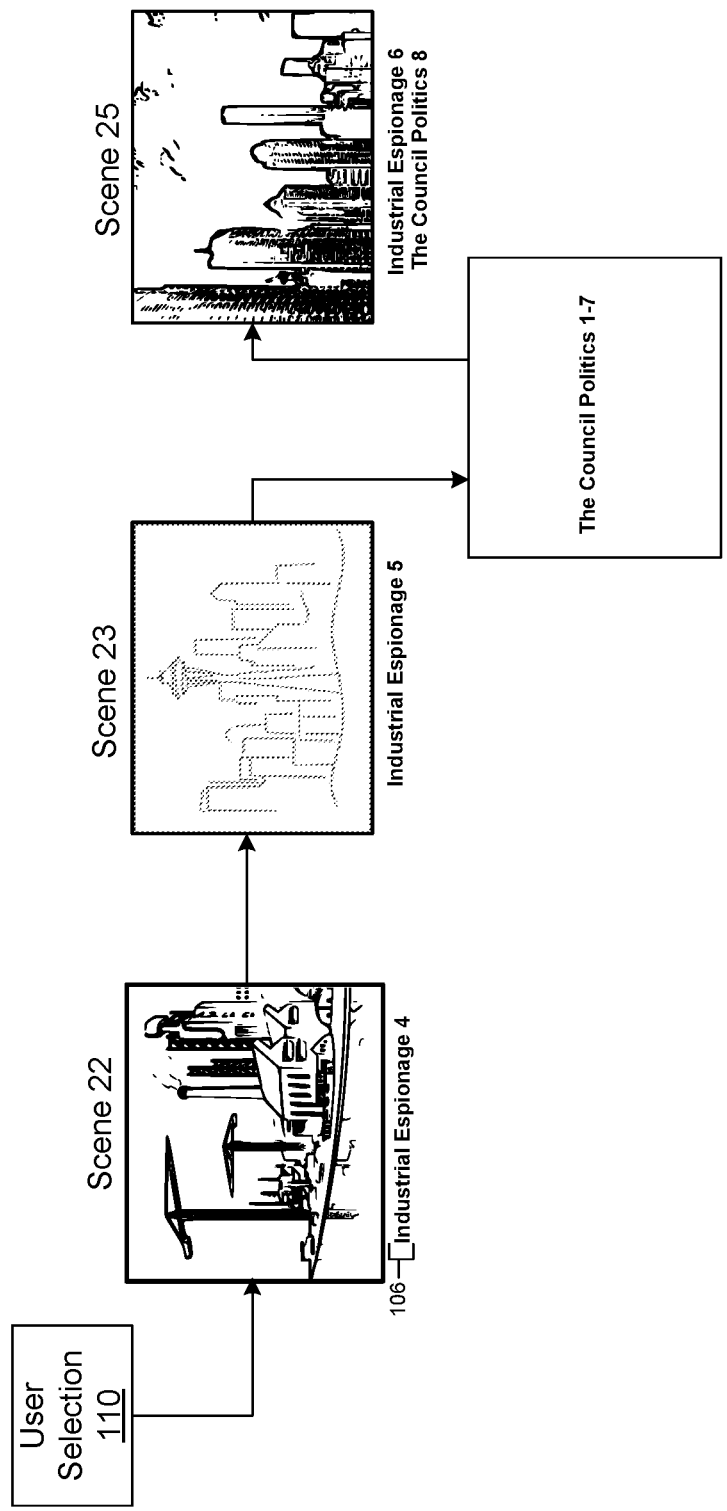
FIG. 1C-1D is a drawing illustrating how a video content object can be consumed according to a semantic graph.

In FIG. 1C, shown is a representation of how an application can perform playback of video content segments of the video content object 100 according to certain semantic attributes, or based on a semantic graph of the video content object 100. As depicted, a user selection 110 can comprise a particular semantic attribute. For example, a user interface front-end can provide the user with a choice to view video content segments that are related to a selected semantic attribute and skip or avoid video content segments that are unrelated. Accordingly, if the user selects the "Industrial Espionage" semantic attribute, a video player or application can determine an ordering of video content segments that are associated with the selected attribute. The video player can then initiate playback of the video content segments that are associated with the selected attribute according to the ordering. In the depicted example, the video player may not initiate playback from the first video content associated with the selected attribute if the user has previously viewed the previous segments associated with the attribute. However, in some examples, the video player can initiate playback from the first video content segment associated with the selected attribute.

Once a video player reaches scene 25, the video player can determine that the scene is dependent upon another node in the semantic graph 146 (FIG. 1B). In this example, the video player can determine that node 166 is dependent upon node 164. The video player can then determine whether the user, based upon a viewing history, has previously viewed the scenes leading up to node 164 on the semantic graph 146. If not, the video player can initiate playback of the scenes corresponding to the parent nodes to node 164 on the semantic graph prior to playing back scene 25.

Figure 1D:
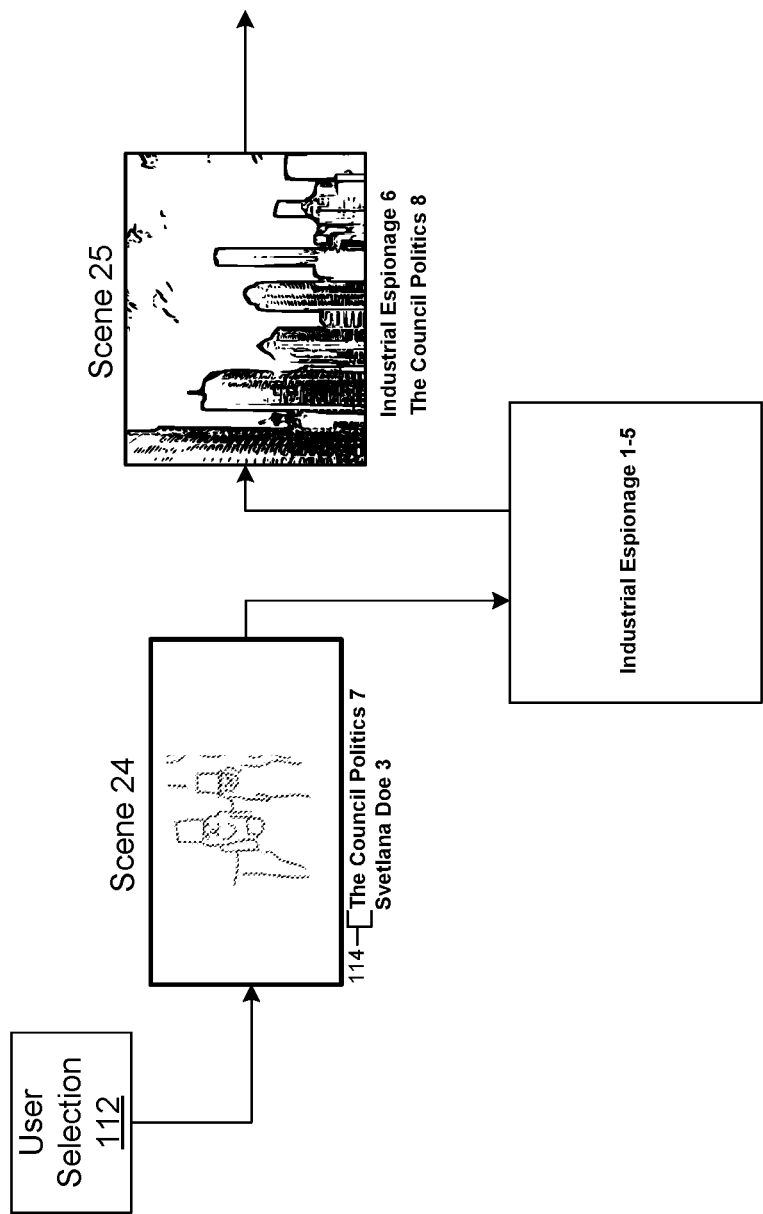

Continuing the example of FIG. 1C, reference is now made to FIG. 1D. In FIG. 1D, a user selection 112 has occurred, and the user selection 112 corresponds to a different semantic attribute 110 than in the example of FIG. 1B. In the example of FIG. 1D, a video player can again determine an ordering of and initiate playback of the video content segments according to the selected semantic attribute. As depicted in FIG. 1D, the user selection 112 corresponds to "The Council Politics," so a video player can determine an ordering of the video content segments associated with the semantic attribute and initiate playback of these video content segments. In this way, a video player can navigate a semantic graph of the video content object rather than only being able to provide a linear viewing experience of scenes that are ordered according to how the original content creator provided the video content object.

Accordingly, embodiments of the disclosure can a different as well as more efficient playback experience for users who may wish to alter the viewing experience of a movie or television series according to a semantic attribute. This can improve user retention and minimize user abandonment of a video viewing or consumption experience. In the following discussion, a general description of the system and its components is provided, followed by a discussion of the operation of the same.

As in the example of FIG. 1C, a video player can traverse the semantic graph that corresponds to the video content object 100 in order to determine which video content segments should be played based upon the user's consumption history. Upon reaching Scene 25, the video player can determine whether the viewer has consumed the "Industrial Espionage" scenes of the video content object 100 by identifying that nodes 164 and 166 are dependent upon one another.

Figure 2:
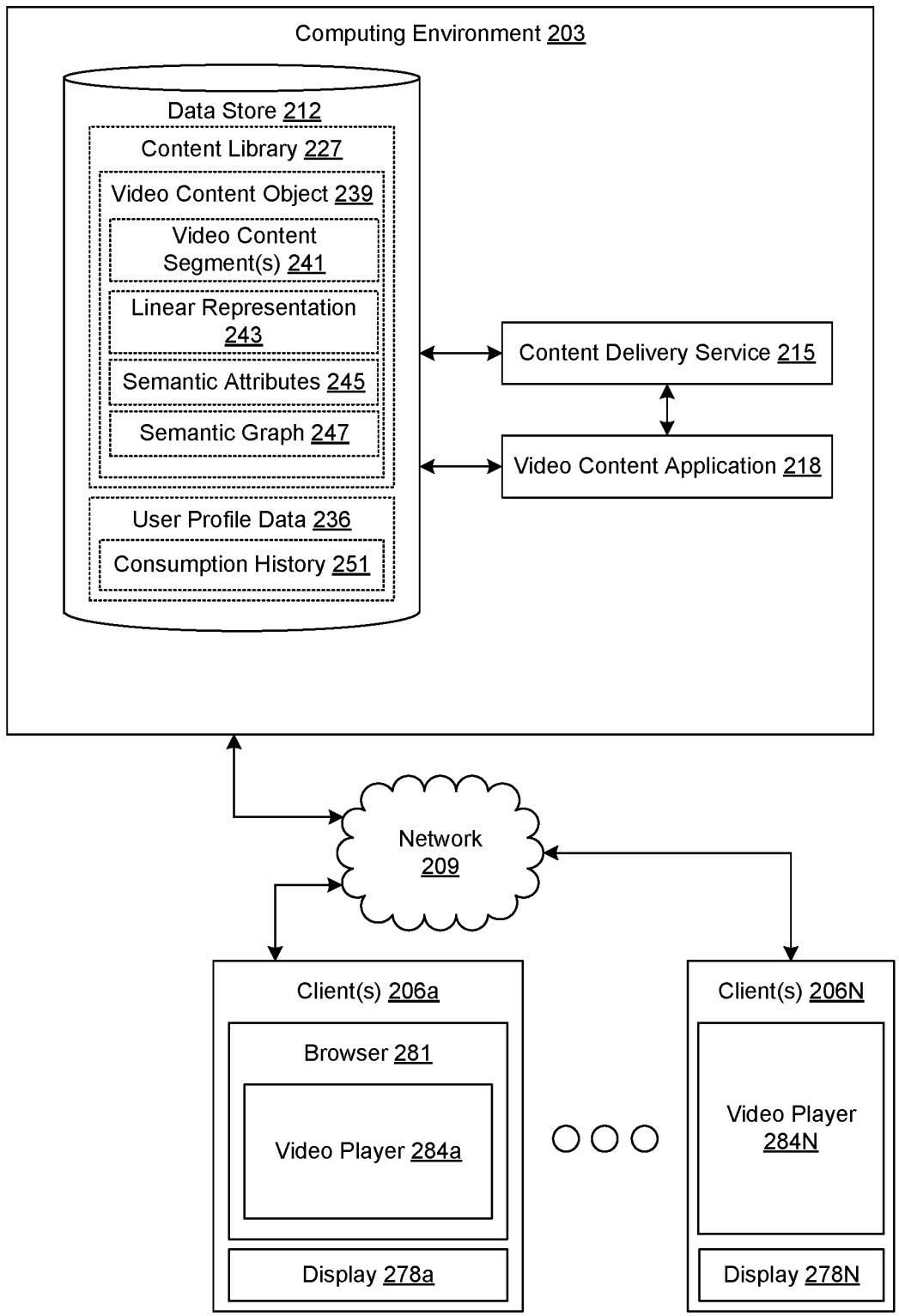
FIG. 2 is a drawing of a networked environment according to various embodiments of the present disclosure.

With reference to FIG. 2, shown is a networked environment 200 according to various embodiments. The networked environment 200 includes a computing environment 203 and a plurality of clients 206a . . . 206N in data communication via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks. In some scenarios, the networked environment 200 may include one or more personal mobile clients 210 in data communication with the network 209.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a content delivery service 215, a video content application 218, and other applications, services, processes, systems, engines, or functionality not discussed in detail herein. The content delivery service 215 is executed to serve up or stream video content to clients 206. The content delivery service 215 may support a resume functionality such that playback of video content may be stopped at a point in the video content on one device and later resumed at that point on the same device or a different device. The content delivery service 215 can also send metadata about a particular piece of content, which can include a semantic graph of the video, video content segments, scene start and end timecodes, or other metadata, to clients 206.

The video content application 218 is executed to process video content objects 239 that can comprise multiple clips, or video content segments 241. The video content application 218 can also generate or obtain a semantic graph corresponding to a particular video content object 239. The video content application 218 can also identify the video content segments 241 that should be provided to a client 206 in response to a request to play or resume playback or streaming of the video content object 239. If a user chooses linear playback of a video content object, such as a movie or an episode of a series, the video content application 218 can determine the ordering of the video content segments selected and provide or stream the video to a client 206 via the content delivery service 215. If a user chooses playback according to a semantic attribute, the video content application 218 can determine an ordering of the video content segments 241 through an analysis of a semantic graph corresponding to the video content object 239. The video content application 218 or the content delivery service 215 can then stream or transmit the video content segments 241 according to the determined ordering to the client 206.

Additional context and discussion for how a semantic graph and semantic attributes associated with a video content object 239 can be utilized to provide a user-driven viewing experienced is discussed in more detail below.

The data stored in the data store 212 includes, for example, a content library 227, user profile data 236, and potentially other data. The content library 227 may include multiple video content objects 239 such as movies, episodes of television shows that are linked together, video clips, and/or other forms of video content. Although described as "video content," it is understood that the video content objects 239 may include accompanying audio, closed captioning text, and/or other data. Additionally, episodes of a series can be linked together under a single series title or under a particular season of a series title.

Each video content object 239 is also linked with various video content segments 241. Video content segments 241 represent portions of a video content object 239. For example, a video content object 239 can be separated into various scenes. In one example, a particular movie can be separated into video content segments 241 that can be played sequentially when the user is experiencing linear playback of the corresponding video content object 239. In another example, a television series or miniseries can represent a video content object 239 that is separated into various episodes. Each of the episodes can in turn be broken down into multiple video content segments 241. Video content segments 241 can be associated with an identifier that is unique with respect to other video content segments 241 within the video content object 239. The video content segments 241 divide a video content object 239 into multiple scenes. A scene corresponds to a period of time in the video content object 239 having multiple frames, and may be determined as having a distinct plot element or setting.

A video content object 239 can also be associated with a linear representation 243. The linear representation 243 of a video content object specifies an ordering of the video content segments 241 as created by a content creator. The linear representation 243 of a movie orders the video content segments 241 in an order as created by a publisher or the movie. The linear representation 243 of a series orders the video content segments 241 into episodes and into seasons as created by the content publisher. In some examples, the linear representation 243 can include chapter, episode, and/or season demarcations.

A content creator can also provide one or more semantic attributes 245 for a particular video content object 239. Semantic attributes 245 can identify a particular character, plotline, location, relationship of a video content segment 241 to a plotline, subplot, character associated with a video content segment 241, or actor associated with a video content segment 241. Semantic attributes 245 can be provided within metadata that is bundled with a video content object 239 and can be defined by a content creator. In some examples, semantic attributes 245 associated with a video content object 239 can obtaining metadata from a user community or a population of users. If a threshold number of users associate a particular semantic attribute 245 with a video content object 239, the video content application 218 can formalize a relationship between the semantic attribute 245 and the video content object 239.

The semantic graph 247 of a video content object 239 relates the semantic attributes 245 of a video content object 239 with particular video content segments 241. The semantic graph 247 can tag certain video content segments 241 with a particular semantic attribute 245 as well as an ordering associated with the semantic attribute 245. For example, a particular video content segment 241 can be identified as the first segment of a particular plotline and the second segment associated with a particular character. In one example, the semantic graph 247 can be represented as a graph data structure that identifies semantic attributes 245 as nodes of the graph. Each of the nodes can also identify a particular video content segment 241 by its unique identifier. The first video content segment 241 or scene of a particular semantic attribute 245 can be a root node of the graph. The root node can identify a next node as the next segment associated with the semantic attribute 245. The next node can identify a different video content segment 241 by its unique identifier. The semantic graph 247 can provide a mechanism by which the video content application 218 can traverse the video content object according to the semantic attributes 245 of the video content object 239.

The semantic graph 247 can be provided by a content creator publishing the video content object 239. In one example, a content creator can identify the various video content segments 241 within the video content object 239 with the necessary metadata so that the semantic graph 247 can be generated by the video content application 218. In one example, the semantic graph 247 can be generated from user-sourced semantic attribute 245 tagging of the video content object 239.

In some examples, the video content application 218 can automatically generate the semantic graph 247 by employing computer vision techniques. In one example, the video content application 218 can analyze the video content segments 241 of a video content object 239 and tag each of the video content segments 241 according to characters appearing within the segments. In one example, the video content application 218 can employ an image recognition technique in which a canonical image of a character provided by a training set of data is compared to objects appearing within the frames of each video content segment 241. If a match between a canonical image of a character and an object within a segment exists, the video content segment 241 can be associated with the semantic attribute 243 specified by the canonical image within the training set of data. A similar process can be performed to identify actors, plotlines, or locations. The training data utilized by the computer-vision technique can identify images associated with semantic attributes 243 that are user specified and determine whether similar or analogous objects appear within certain video content segments 241 of the video content object 239. In this way, the video content application 218 can automatically generate a semantic graph 249 for a video content object 239 even when the content-creator did not provide the semantic graph 249.

Scene dependences can by specified by the semantic graph 247. Scene dependencies identify dependency relationships between scenes or video content segments 241. A scene dependency can represent a relationship between video content segments 241 whereby, in order for playback of a scene associated with a node within the semantic graph 247, the video content application 218 identifies other video content segments 241 within the video content object 239 that are played back first. For example, in order to understand a particular plotline or subplot, the semantic graph 247 can identify other scenes or video content segments 241 by their identifier that should also be played back in order for a user to understand the particular plotline or subplot.

The semantic attributes 245 can identify the cast members or characters who perform in a given video content segment 241. In some cases, the semantic graph 247 may record the times when the cast members or characters first appear in a scene, last appear in the scene, or are on-screen. In some embodiments, the times may be represented as a frame number, or a range of frame numbers, in the video content object 239 or video content segments 241. The semantic graph 247 may also include positional or location information as to where cast members and/or products appear within a frame on screen.

The user profile data 236 includes various data about users of the content delivery service 215 or video content application 218. The user profile data 236 may include a consumption history 251, a purchase history, payment information, profile data, and/or other data. For example, a user may have rented or purchased a particular video content object 239. In some cases, a user may have a subscription that provides access to all or some of the video content objects 239. Such a subscription may be limited in some way (e.g., number of titles, number of bytes, quality level, time of day, etc.) or unlimited.

The consumption history 251 may include various data describing a viewing history, behavior, and/or preferences of a user. Such data may include a purchase history, a browsing history, a view history, selected titles history, explicitly configured viewing preferences, video content review history, and/or other data. The consumption history 251 can be employed by the content delivery service 215, the video content application 218, and/or video players executed by a client 206 to determine a last-viewed or consumed portion of a particular video content object 239. Such data can be utilized in order to enable a resume functionality where the user can resume content from a particular portion of the linear representation 243 or during playback of video content segments 241 according to a semantic graph 247.

The clients 206 are representative of a plurality of client devices that may be coupled to the network 209. Each client 206 may comprise, for example, a processor-based system such as a computer system. Such a computer system may be embodied in the form of a smart television, a desktop computer, a laptop computer, personal digital assistants, cellular telephones, smartphones, set-top boxes, music players, web pads, tablet computer systems, game consoles, electronic book readers, or other devices with like capability. Each client 206 may include one or more displays 278a . . . 278N. Each display 278 may comprise, for example, one or more devices such as liquid crystal display (LCD) displays, gas plasma-based flat panel displays, organic light emitting diode (OLED) displays, LCD projectors, or other types of display devices, etc. In some embodiments, the displays 278 may correspond to touchscreen displays.

Each client 206 may be configured to execute various applications such as a browser 281, a respective one of a plurality of video players 284a . . . 184N, and/or other applications. The browser 281 may be executed in a client 206, for example, to access network content served up by the computing environment 203 and/or other servers, thereby rendering a user interface on the display 278. The video player 284 is executed to obtain video content objects 239 from the content delivery service 215 and to render the video content segments 241 of the video content object 239 on the display 278.

In some cases, the video content object 239 may be rendered on a different display 278 (of the same or different client 206) from the user interface. In one embodiment, the video player 284 may be a plug-in of the browser 281 or otherwise executed in the environment of the browser 281. The clients 206 may be configured to execute other applications such as, for example, mobile applications, email applications, social networking applications, etc.

Next, additional description of the operation of the various components of the networked environment 200 is provided. To begin, a user may acquire rights to view video content objects 239 in a content library 227. A client 206 associated with a user may request to stream or download a video content object 239 from the content delivery service 215. The video content application 218 can obtain or generate a semantic graph 247 corresponding to video content objects 239 from the content library 227. The semantic graph 247 can be provided to a video player 284 executed by a client 206 or retained by the computing environment 203 if the video content segments 241 are simply streamed from the content delivery service 215.

In one example, the video player 284 of the client 206 renders the video content segments 241 on the display 278. The video player 284 may also render various user interfaces on the display 278 that allow a user to initiate playback of the video content object 239 according to the linear representation 243 or an alternative playback according to semantic attributes 245 that are provided in the semantic graph 247. The user interfaces may allow view those video content segments 241 that are related to semantic attributes in which the user is interested, which can result in playback of the video content segments 241 in an order that is different from and even omits segments from the linear representation 243.

As one example, a user might be interested in a certain character, plotline, location depicted within the video content object 239, etc. The semantic graph 247 and its interpretation by a video player 284 or video content application 218 can allow the user to consume only those portions of the video content object 239 in which she is interested. For example, a user might have already seen a linear representation 243 of a movie or series. To experience a second or alternative viewing, the user might wish to skip scenes related to a plotline in which the user did not like. The semantic graph 247 can provide such a viewing experience to the user. An example of a user interface through which a user can enable such an experience is provided in FIG. 3.

It is understood that multiple clients 206 and multiple displays 278 may be employed in some embodiments. For example, the video content object 239 may be rendered on one display 278, while the user interface is rendered on another display 278. Where the displays 278 are attached to different clients 206, the clients 206 may communicate directly via the network 209 or indirectly with communication facilitated by the content delivery service 215. The communication is used to synchronize the rendering of the video content object 239 with what is occurring in the separately rendered user interface. For example, if a user employs the user interface in one client 206 to jump to another scene of the video content object 239, the communication informs the other client 206 to begin or cue playback at the other scene.

In some embodiments, the video content object 239 may be rendered in a movie theater or on a display device which is not in communication with a client 206. In such embodiments, the client 206 may determine a current time or scene in the video content object 239 through analysis of captured video and/or audio from the rendered video content object 239. In some cases, the video player 284 may be awakened to present the user interface in response to detecting applause, laughter, or other cues that indicate presence in a viewing area for a video content object 239.

Figure 3:
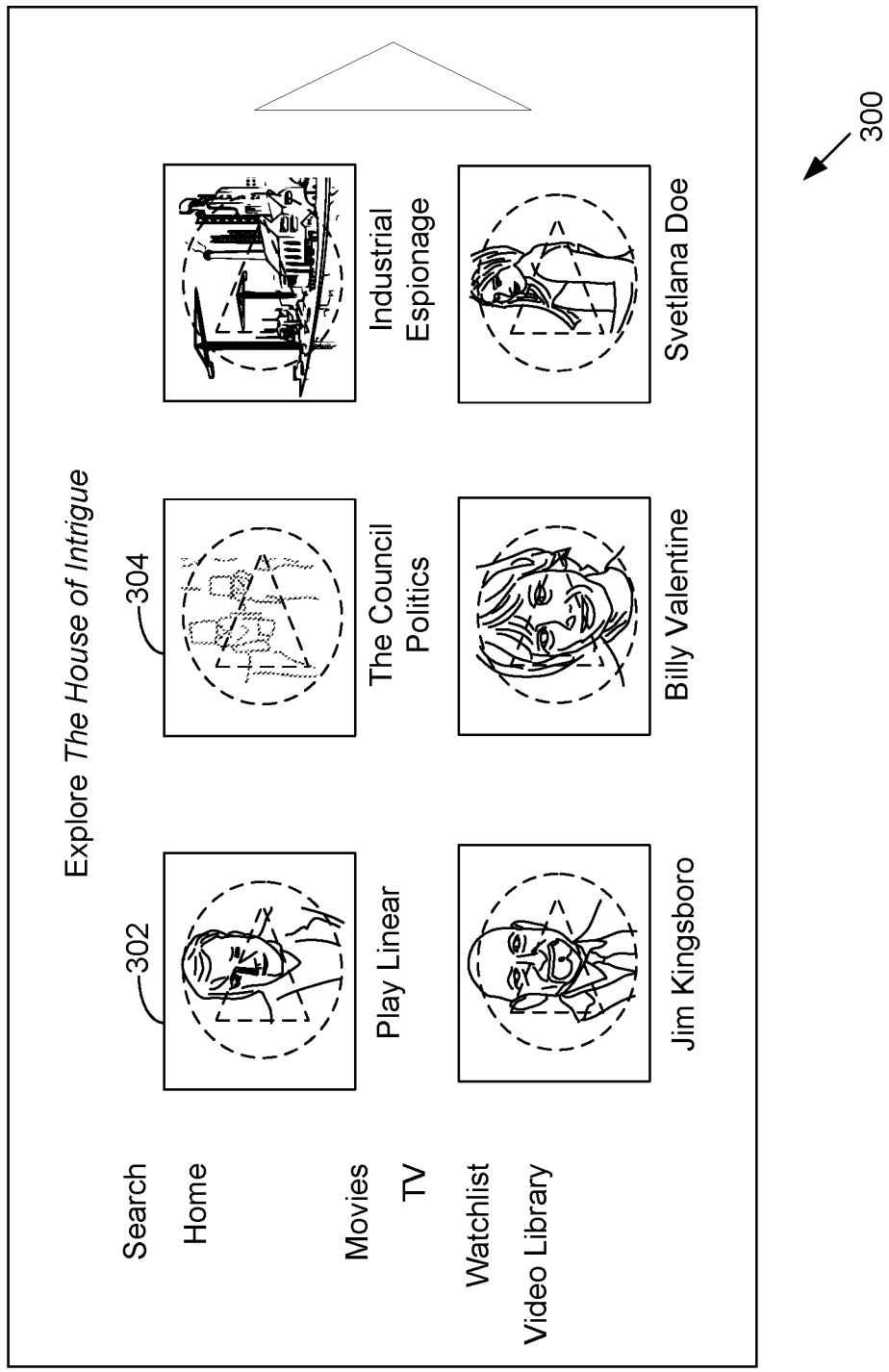
FIG. 3 is a drawing of an example user interface rendered by a client in the networked environment of FIG. 1 according to various embodiments of the present disclosure.

Referring next to FIG. 3, shown is one example of a video selection user interface 300 rendered on a display 278 (FIG. 2) of a client 206 (FIG. 2) in the networked environment 200 (FIG. 2) according to various embodiments. In one example, video content segments 241 of a video content object 239 may be streamed over the network 209 (FIG. 2) or previously downloaded to the client 206.

In the video selection user interface 300 of FIG. 3, an option 302 is provided to view or resume the video content object 239 according to its linear representation 243. In other words, the user can experience the video content object 239 according to an originally produced ordering of the video content segments 241. However, additional options, such as option 304, can also be provided that allow the user to experience the video content object 239 in a different ordering of the video content segments 241.

The alternative options, such as option 304 and options other than option 302, can be generated from the semantic graph 247 corresponding to the video content object 239 or from the semantic attributes 245 that are associated with the video content object 239. In one scenario, all of the semantic attributes 245 appearing within the video content object 239 can be shown as options. In another scenario, the video content application 218 and/or video player 284 can identify only those semantic attributes 245 associated with a threshold number of nodes within the semantic graph 247 as options within the video selection user interface 300. Accordingly, if the user selects option 304, for example, the video content application 218 can determine an ordering of the video content segments 241 that are associated with the selected semantic attribute 245. The video content application 218, content delivery service 215 and/or video player 284 can then initiate playback of the video content segments 241 associated with the selected semantic attribute 245. In one example, playback can be initiated from a most recently played video content segment 241 that is associated with the selected semantic attribute 245.

Stated another way, nodes of the semantic graph 247 that are associated with the selected semantic attribute 245 can be traversed and the video content segments 241 corresponding to the traversed nodes can be played back by the video player 284, content delivery service 215 and/or video content application 218. In one scenario, a root node of the semantic graph 247 that corresponds to the selected semantic attribute 245 can be located. The video content segment 241 identified by the root node can be played back. The next node identified by the semantic graph 247 can be identified and the video content segment 241 identified by the next node can be played back, and so on. In one example, playback can be initiated from a most recently played node that is associated with the selected semantic attribute 245. In other words, the user can also resume playback according to a semantic attribute 245.

Figure 4:
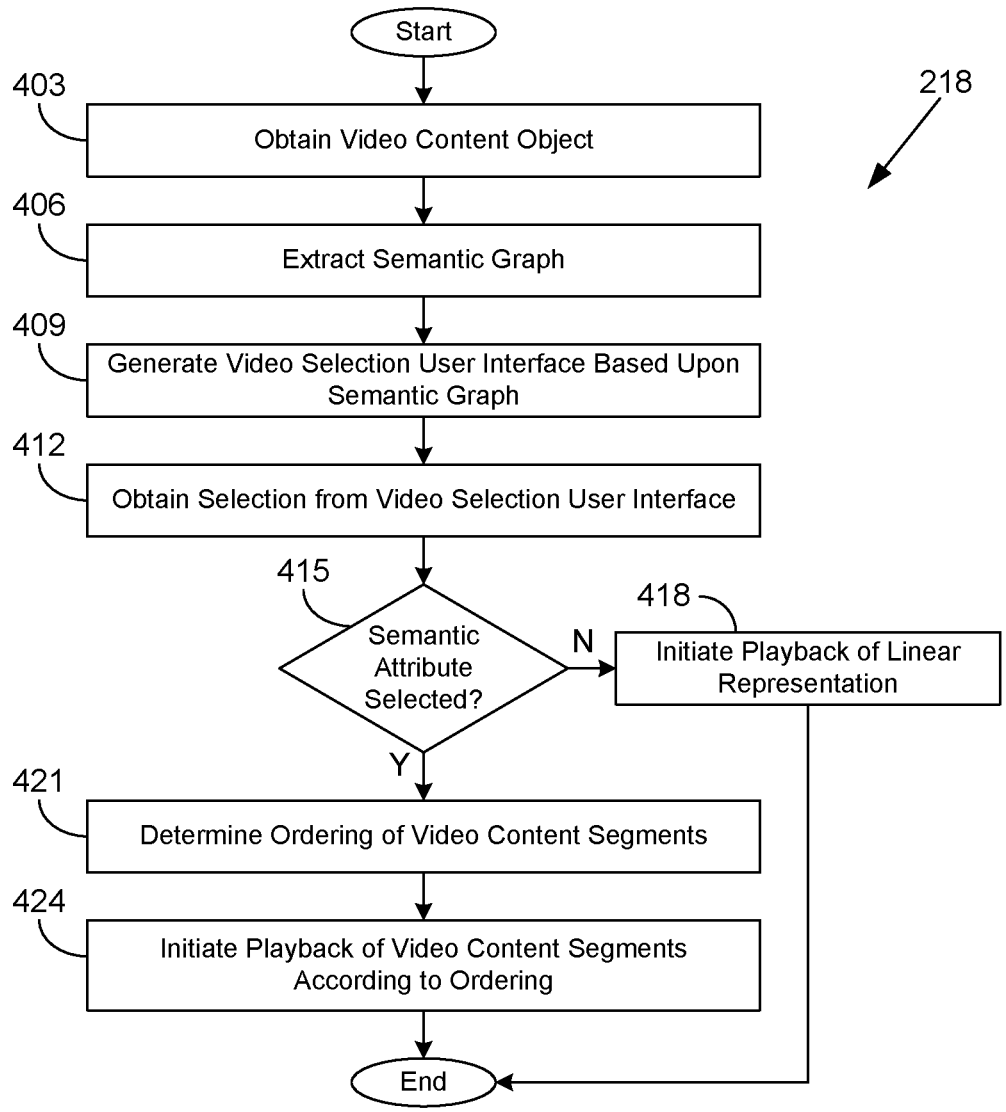
FIG. 4 is a flowchart illustrating one example of functionality implemented as portions of a video content application executed in a computing environment in the networked environment of FIG. 1 according to various embodiments of the present disclosure.

Referring next to FIG. 4, shown is a flowchart that provides one example of the operation of a portion of the video content application 218 according to various embodiments. It is understood that the flowchart of FIG. 4 provides merely an example of the many different types of functional arrangements that may be employed to implement the operation of the portion of the video content application 218 as described herein. As an alternative, the flowchart of FIG. 4 may be viewed as depicting an example method implemented in the computing environment 203 (FIG. 2) according to one or more embodiments. In some examples, some or all of the functionality illustrated in FIG. 4 can also be performed by the content delivery service 215 or the video player 284.

Beginning with box 403, the video content application 218 obtains a video content object 239 that corresponds to a movie or series. At box 406, the video content application 218 extracts a semantic graph 247 associated with the video content object 239. In some examples, the semantic graph 247 can be provided along with metadata for the video content object 239 by a content creator or publisher. In other examples, the semantic graph 247 can be generated automatically by relying upon user identified semantic attributes 245 that are identified by a threshold number of user votes. Additionally, if a threshold number of votes identify that a particular video content segment 241 is associated with a semantic attribute 245, the segment can be associated with the semantic attribute 245 in the semantic graph. In another example, a computer-vision technique can be employed to generate a semantic graph 247 from a training set of data that includes images and/or videos provided by an editorial user or through voting data from a population of users.

At box 409, the video content application 218 can generate a video selection user interface that allows a user to select playback options of the video content object 239. At box 412, the video content application 218 can obtain a user selection from the video selection user interface. At box 415, the video content application 218 determines whether a semantic attribute 245 was selected rather than linear playback of the video content object 239. If a semantic attribute 245 was not selected at box 415, at box 418, the video content application 418 can initiate linear playback of the video content object 239 based upon the linear representation 243.

If a semantic attribute 245 was selected at box 415, the process proceeds to box 421 where the video content application 218 determines an ordering of the video content segments according to the selected attribute. In other words, the video content application 218 can traverse the nodes of the semantic graph 247 that correspond to the selected semantic attribute 245. In some examples, the video content application 218 can identify a resume point within the semantic graph 247 that corresponds to a last-viewed node of the semantic graph 247 by the user in order to resume playback at that node and its corresponding video content segment 241. In this way, even if the user has previously viewed the video content segment 241 corresponding to the node in a linear viewing of the video content object 239 or during playback of another portion of the semantic graph 247, the video content application 218 can support resuming playback of the selected semantic attribute 245. At box 424, the video content application 218 can initiate playback of the video content segments 241 according to the ordering that is determined at box 421. Thereafter, the portion of the video content application 218 ends.

Figure 5:
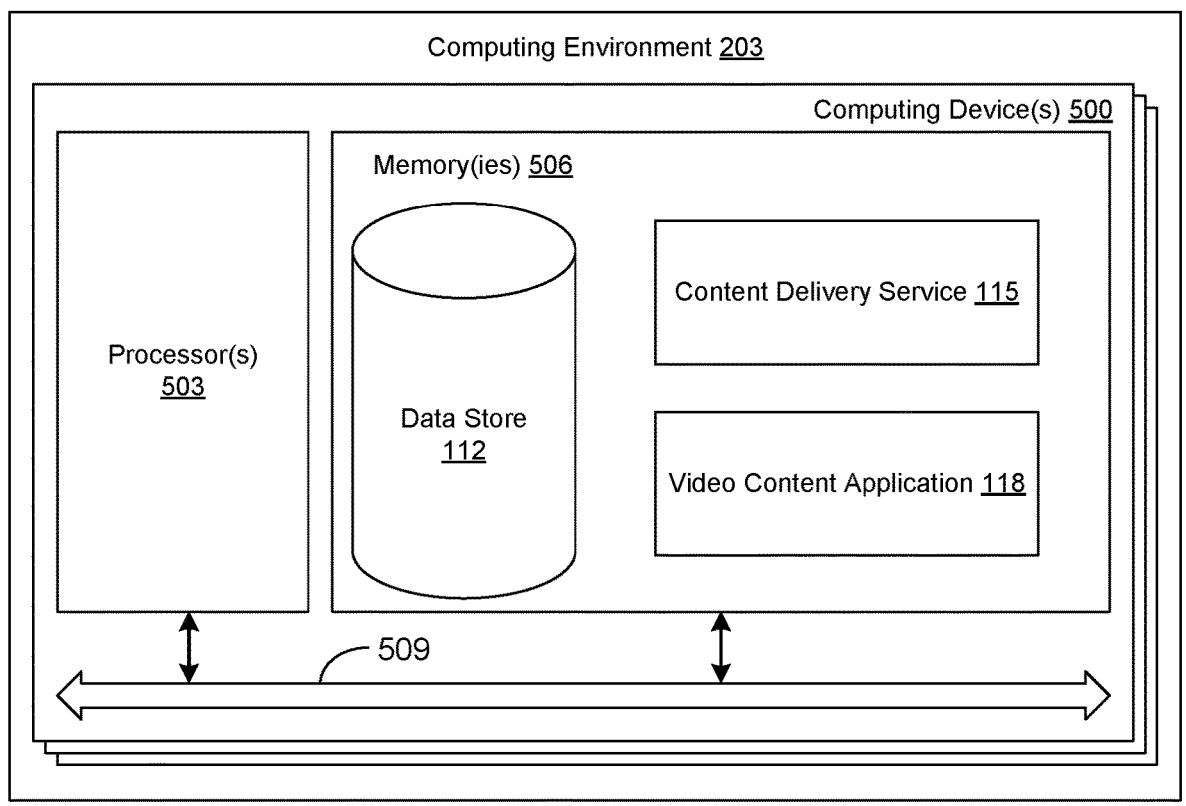
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are a content delivery service 215, a video content application 218, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the content delivery service 215, the video content application 218, the video player 284 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the video content application 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 show a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content delivery service 215, the video content application 218, and the video player 284, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the content delivery service 215, the video content application 218, and the video player 284, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method, comprising:
   obtaining a video content object, the video content object comprising a plurality of video content segments, the video content segments comprising a portion of a linear representation of the video content object;
   obtaining metadata associated with the video content object, the metadata including a semantic graph that identifies a plurality of semantic attributes, wherein the plurality of semantic attributes comprise: a character, a plotline, a location, a relationship of a video content segment to a plotline, a subplot, or an identity of a character associated with a video content segment, the semantic graph further specifying a first ordering of the video content segments according to the plurality of semantic attributes and a second ordering of the video content segments within the linear representation;
   determining that at least a subset of the semantic attributes are associated with at least a threshold number of nodes within the semantic graph;
   generating a video selection user interface, the video selection user interface containing a plurality of selections, the plurality of selections generated from the semantic graph and corresponding to the at least the subset of the semantic attributes associated with the at least the threshold number of nodes within the semantic graph, the plurality of selections comprising a first option to initiate playback of the first ordering of the video content segments according to the character, and a second option to initiate playback of a different ordering of the video content segments according to at least one of: the plotline, the location, the relationship of the video content segment to the plotline, the subplot, or the identity of the character associated with the video content segment;
obtaining a selection of one of the plurality of selections in the video selection user interface;
determining a subset of the plurality of video content segments and an ordering of the subset based at least in part upon the selection and the semantic graph; and
initiating playback of the subset of the plurality of video content segments based at least in part on the ordering of the subset.

2. The method of claim 1, further comprising:
obtaining a plurality of user votes identifying a semantic attribute associated with a particular video content segment; and
generating the semantic graph based upon the plurality of user votes.

3. The method of claim 1, wherein:
determining an ordering of the subset of the plurality of video content segments further comprises identifying a plurality of dependent video content segments from the plurality of video content segments based at least in part upon the semantic graph; and
wherein initiating playback of the subset of the video content segments further comprises initiating playback of the dependent video content segments according to timecode ordering of the dependent video content segments.

4. The method of claim 3, wherein identifying the dependent video content segments further comprises identifying, from the semantic graph, other video content segments that are identified as related to a semantic attribute associated with the selection.

5. The method of claim 3, wherein identifying the dependent video content segments further comprises identifying, from the semantic graph, other video content segments that are identified as related to a semantic attribute associated with the selection.

6. The method of claim 1, wherein determining the ordering of the subset of the plurality of video content segments further comprises ordering the subset of the video content segments associated with a selected semantic attribute according to an order in which the subset of video content segments appear within the linear representation.

7. The method of claim 1, wherein initiating playback of the subset of the plurality of video content segments is further based at least in part on at least one of: a video content segment associated with a root node or a most recently played video content segment associated with the semantic graph.

8. A method, comprising:
obtaining a semantic graph associated with a video content object, the semantic graph identifying a plurality of semantic attributes associated with the video content object and identifying a plurality of video content segments associated with individual ones of the plurality of semantic attributes, wherein the plurality of semantic attributes comprise a character, a plotline, a location, a relationship of a video content segment to a plotline, a subplot, or an identity of a character associated with a video content segment;
determining that at least a subset of the semantic attributes are associated with at least a threshold number of nodes within the semantic graph;
generating a video selection user interface, the video selection user interface containing a plurality of selections, the plurality of selections generated from the semantic graph and corresponding to the at least the subset of the semantic attributes associated with the at least the threshold number of nodes within the semantic graph, the plurality of selections comprising a first option to initiate playback according to the character, and a second option to initiate playback according to at least one of: the plotline, the location, the relationship of the video content segment to the plotline, the subplot, or the identity of the character associated with the video content segment;
obtaining a selection of one of the plurality of selections in the video selection user interface;
identifying a subset of the video content segments associated with the selection based at least in part upon the selection and the semantic graph;
determining an ordering of the subset of the video content segments associated with the subset of the video content segments based at least in part upon the selection and the semantic graph; and
initiating playback of the subset of the video content segments according to the ordering.

9. The method of claim 8, wherein determining the ordering of the subset of the video content segments comprises ordering the subset of the video content segments according to an order in which the subset of the video content segments appears within a linear representation of the video content object.

10. The method of claim 9, wherein the ordering of the subset of the video content segments varies from an ordering of the video content segments within the linear representation of the video content object.

11. The method of claim 8, wherein the semantic graph identifies the video content segments by specifying a respective beginning timecode and a respective ending timecode for each of the video content segments.

12. The method of claim 8, wherein identifying a subset of the plurality of video content segments associated with the selection further comprises identifying a plurality of dependent video content segments associated with at least one of the subset of video content segments.

13. The method of claim 8, wherein the plurality of video content segments are not linked with the one of the plurality of semantic attributes by the semantic graph.

14. The method of claim 8, wherein obtaining the semantic graph associated with the video content object comprises obtaining a threshold number of user votes identifying a particular semantic attribute, a beginning timecode and an ending timecode associated with the particular semantic attribute.

15. A system, comprising:
at least one computing device;
a video content library accessible to the at least one computing device; and
a video content application executed by the at least one computing device, wherein the video content application, when executed, causes the at least one computing device to at least:
extract metadata associated with a video content object, the metadata comprising a semantic graph identifying a plurality of semantic attributes associated with the video content object, wherein the plurality of semantic attributes comprise a character, a plotline, a location, a relationship of a video content segment to a plotline, a subplot, or an identity of a character associated with a video content segment;

identify a plurality of video content segments associated with individual ones of the plurality of semantic attributes;

determine that at least a subset of the semantic attributes are associated with at least a threshold number of nodes within the semantic graph;

generate a video selection user interface, the video selection user interface containing a plurality of selections, the plurality of selections generated from the semantic graph and corresponding to the at least the subset of the semantic attributes associated with the at least the threshold number of nodes within the semantic graph, the plurality of selections comprising a first option to initiate playback according to the character, and a second option to initiate playback according to at least one of: the plotline, the location, the relationship of the video content segment to the plotline, the subplot, or the identity of the character associated with the video content segment;

obtain a selection of one of the plurality of selections in the video selection user interface;

identify a subset of the video content segments associated with the selection and an ordering of the subset, based at least in part upon the selection and the semantic graph; and initiate playback of the subset of the video content segments associated with the selection according to the ordering.

16. The system of claim 15, wherein the video content application causes the at least one computing device to at least determine an ordering of the subset of the video content segments associated with the subset of video content segments.

17. The system of claim 16, wherein the ordering of the subset of the video content segments varies from an ordering of the video content segments within a linear representation of the video content object.

18. The system of claim 15, wherein the one of the semantic attributes corresponds to the character and the video content application initiates playback of the subset of the video content segments by identifying video content segments associated with the character.

19. The system of claim 15, wherein one of the plurality of semantic attributes identifies another one of the video content segments that is a dependent video content segment relative to a particular video content segment.

20. The system of claim 15, wherein the semantic graph comprises a graph data structure that identifies the video content segments and a relationship between the video content segments according to the semantic attributes.

* * * * *